United States Patent
Wang et al.

(10) Patent No.: US 12,276,746 B2
(45) Date of Patent: Apr. 15, 2025

(54) SOUND SOURCE IDENTIFICATION METHOD AND SYSTEM BASED ON ARRAY MEASUREMENT AND SPARSE PRIOR INFORMATION

(71) Applicant: TSINGHUA UNIVERSITY, Beijing (CN)

(72) Inventors: Tianyang Wang, Beijing (CN); Shilin Sun, Beijing (CN); Fulei Chu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/774,408

(22) PCT Filed: Dec. 2, 2021

(86) PCT No.: PCT/CN2021/135053
§ 371 (c)(1),
(2) Date: May 4, 2022

(87) PCT Pub. No.: WO2022/247202
PCT Pub. Date: Dec. 1, 2022

(65) Prior Publication Data
US 2024/0255607 A1   Aug. 1, 2024

(30) Foreign Application Priority Data

May 24, 2021 (CN) .......................... 202110564464.5

(51) Int. Cl.
*G01S 5/22* (2006.01)
*G01S 3/80* (2006.01)
*G01S 3/808* (2006.01)

(52) U.S. Cl.
CPC .............. *G01S 5/22* (2013.01); *G01S 3/8083* (2013.01)

(58) Field of Classification Search
CPC .................................. G01S 5/22; G01S 3/8083
(Continued)

(56) References Cited

U.S. PATENT DOCUMENTS

2008/0219454 A1* 9/2008 Iida .......................... H04S 3/00
381/17
2009/0034772 A1* 2/2009 Iida ......................... H04S 7/302
381/356

(Continued)

FOREIGN PATENT DOCUMENTS

CN          101065990 A     10/2007
CN          101175343 A      5/2008
(Continued)

*Primary Examiner* — Daniel L Murphy
*Assistant Examiner* — Amie M Ndure
(74) *Attorney, Agent, or Firm* — HOLZER PATEL DRENNAN

(57) ABSTRACT

The present disclosure provides sound source identification based on array measurement and sparse prior information, which uses a generalized minimax concave penalty function to apply a sparse constraint on a sound source reconstruction error, determines position information of a potential sound source according to a basic sound image generated by a conventional beamforming method, and generates an initial solution vector including a sound source position prior information in a specific way. Compared with using a random initial value and a zero initial value, computational efficiency of the disclosed sound field reconstruction method is improved. Further, an iterative convergence speed is improved by using a proximal gradient acceleration and an adaptive step size backtracking strategy, an optimal step size that can meet convergence is adaptively selected, and sound field reconstruction can be completed more quickly. The present disclosure realizes high-resolution and high-efficiency sound source identification by using a microphone array.

10 Claims, 3 Drawing Sheets

(58) Field of Classification Search
USPC .......................................................... 367/127
See application file for complete search history.

(56) References Cited

U.S. PATENT DOCUMENTS

| | | | | |
|---|---|---|---|---|
| 2011/0222372 A1* | 9/2011 | O'Donovan | .......... | G01S 3/8083 |
| | | | | 367/103 |
| 2014/0111372 A1* | 4/2014 | Wu | .......... | G01S 7/021 |
| | | | | 342/146 |
| 2014/0235965 A1* | 8/2014 | Tran | .......... | A61B 5/7465 |
| | | | | 600/407 |
| 2018/0130491 A1* | 5/2018 | Mathur | .......... | H04S 7/307 |

FOREIGN PATENT DOCUMENTS

| | | |
|---|---|---|
| CN | 112526451 A | 3/2021 |
| CN | 113238189 A | 8/2021 |
| WO | 2014066360 A1 | 5/2014 |

* cited by examiner

SOUND SOURCE IDENTIFICATION METHOD AND SYSTEM BASED ON ARRAY MEASUREMENT AND SPARSE PRIOR INFORMATION

TECHNICAL FIELD

The present disclosure relates to a technical field of signal processing, and more specifically to a sound source identification method based on array measurement and sparse prior information.

BACKGROUND ART

Sound sources are widely existed in many scenes such as life and production, for example, a car with insufficient air tightness may produce abnormal sound in a cab during driving, and a machine will produce mechanical noise due to cooperation and movement between different parts during operation. These sounds can be heard in multiple directions by human ears after transmission, but it is difficult to directly locate locations of the sound sources. If spatial location and intensity estimation of the sound sources can be realized, the locations and generation mechanisms of the sounds such as an abnormal sound and a noise can be determined, so as to provide reference for improving a design scheme of equipments. In addition, various sounds during operation periods of mechanical equipments can reflect operating states thereof. Therefore, it can also provide key information for structural health monitoring and fault diagnosis of the mechanical equipments by identifying the sound sources and extracting sound signal characteristics.

A microphone array is an important device to realize sound source identification. Compared with a traditional sound signal acquisition by single measuring point, the microphone array can obtain spatial information of the sound signal, enhance an acquisition ability for a signal in a specific direction by reconstructing a sound field distribution or forming a virtual beam, suppress interference caused by signals in other directions, and realize spatial filtering and directional acquisition of the sound. By using the microphone array and an appropriate sound source identification algorithm, the sound source can be identified visually, so as to locate a location of the sound source and determine intensity of the sound source.

At present, calculation methods used for microphone array sound source identification can be mainly divided into three categories: a conventional beamforming method based on delay-sum, an adaptive beamforming method based on statistical characteristics and a sound field reconstruction method based on acoustic inverse problem. Among them, the conventional beamforming method based on delay-sum only considers spatial position relationship between the sound source and microphones, can be carried out in a time domain or a frequency domain, and has fast calculation speed and good robustness; however, since a sidelobe interference cannot be completely suppressed, and a main lobe width is limited by factors such as array size, number of the microphones, positions of the microphone, an accuracy of an acquired result is poor, therefore, it is mainly used in occasions with low requirements for accuracy of result. The adaptive beamforming method based on statistical characteristics adaptively determines a weight of each microphone according to a received signal, so as to realize suppression of specific noise and sidelobe control; according to selected statistics, it can be divided into a minimum variance distortionless response beamforming method (CN201410317216), a linearly constrained minimum variance beamforming method (CN201611150238), etc.; these methods ensure optimization of target statistics by solving specific optimization problems, so as to suppress interference of noise and sidelobe on a beamforming result, however, its spatial resolution is limited by Rayleigh criterion and it is not suitable for an intensity estimation of multiple sound sources. The sound field reconstruction method based on acoustic inverse problem is based on a sound propagation model and solves a underdetermined optimization problem by applying a result sparsity constraint condition, therefore, it can break through a limitation of the Rayleigh criterion and realize a sound source identification with super-resolution by less microphones and data (CN201710493279, CN201410578704); according to relevant theory of compressed sensing, the sparse constraint can be expressed by a 0-norm of a vector, so applying the sparse constraint means minimizing the 0-norm of the result vector in a feasible region of the problem, and this kind of optimization problem can also be written in a form of weighted summation of an objective function and a penalty function. In the existing sound source identification methods for reconstructing the sound field based on the acoustic inverse problem, the sparse constraint is implemented by 1-norm or a greedy algorithm. Since there is an inherent difference between the 1-norm and the 0-norm, and the greedy algorithm cannot guarantee that the result is a global optimal solution, these methods can only approximately represent a role of the sparse constraint, so that the sound source identification problem can only be approximately solved, and it is difficult to guarantee the reliability of the sound source identification result.

Therefore, there is an urgent need for a sound source identification method based on array measurement and sparse prior information, which can enhance the resolution of the sound source identification result and improve a computational efficiency, the result is more accurate than the conventional beamforming method, and has a higher computational efficiency than the method reconstructing the sound field directly based on a generalized minimax concave penalty function.

SUMMARY

In view of the above problems, an object of the present disclosure is to provide a sound source identification method based on array measurement and sparse prior information, so as to overcome problems of low spatial resolution of the result obtained based on the conventional beamforming method and low computational efficiency of the sound field reconstruction method based on the generalized minimax concave penalty.

The present disclosure provides a sound source identification method based on array measurement and sparse prior information, which comprises:
  building a sound source identification problem model according to a characteristic of a target sound source and position information of array elements in a microphone array, and obtaining a basic sound image based on the sound source identification problem model;
  extracting a peak in the basic sound image and obtaining position index information of a solution vector of a potential sound source according to a coordinate of the peak;
  determining the number and a distribution regularity of support sets in the solution vector according to the position index information, and creating an initial solution vector $x^{(0)}$ for sound field reconstruction according to the number and the distribution regularity of the support sets; and obtaining an optimal solution based on the initial solution vector $x^{(0)}$ through proximal gradient iteration and generating a high-resolution sound image according to the optimal solution.

Preferably, building the sound source identification problem model according to the characteristic of the target sound source and the position information of the array elements in the microphone array comprises:

Dividing an obtained reconstruction plane into reconstruction grid points, and obtaining a sound source frequency of a preset reconstruction sound source;

calculating a sound signal expressed in a frequency domain corresponding to an array coordinate in the microphone array based on the reconstruction grid points and the sound source frequency; and building the sound source identification problem model between a vector of a sound signal received by the microphone array and a vector of a sound source intensity of the reconstruction sound source according to a relationship between the microphone array and the reconstruction sound source.

Preferably, obtaining the basic sound image based on the sound source identification problem model comprises:

solving sound source information about the target sound source in the sound source identification problem model by using a beamforming method according to a minimum energy principle, so as to obtain the basic sound image.

Preferably, extracting the peak in the basic sound image and obtaining the position index information of the solution vector of the potential sound source according to the coordinate of the peak comprises:

calculating a mean value of elements included in the basic sound image, and setting elements with values less than a preset value as 0, so as to form an effective sound image;

performing a two-dimensional convolution operation on the effective sound image to obtain a filtered sound image; and traversing and sorting the filtered sound image to form a sorting list, and selecting a position vector of the potential sound source in the sorting list according to a preset number to form the position index information of the solution vector in the sound source identification method.

Preferably, in creating the initial solution vector $x^{(0)}$ for the sound field reconstruction, the initial solution vector $x^{(0)}$ comprises a position element corresponding to the position vector and other elements, and wherein a value of the position element is randomly generated, and values of the other elements are 0.

Preferably, the method further comprises, before obtaining the optimal solution based on the initial solution vector $x^{(0)}$ through the proximal gradient iteration and generating the high-resolution sound image according to the optimal solution, constructing an acoustic inverse problem with a minimax concave penalty constraint, wherein the optimal solution is a solution of the acoustic inverse problem.

Preferably, the method further comprises, before obtaining the optimal solution based on the initial solution vector $x^{(0)}$ through the proximal gradient iteration and generating the high-resolution sound image according to the optimal solution to complete the sound source identification, building a sparsity regularized sound field reconstruction optimal problem model for a generalized Huber function; and constructing a matrix $$B = \sqrt{\frac{\gamma}{\lambda}} A$$

in the generalized Huber function, wherein A is a matrix in the sparsity regularized sound field reconstruction optimal problem model, $\lambda$ is a constructed regularization parameter, and $\gamma$ is a constructed convexity balance parameter.

Preferably, obtaining the optimal solution based on the initial solution vector $x^{(0)}$ through the proximal gradient iteration and generating the high-resolution sound image according to the optimal solution to complete the sound source identification comprises:

initializing an iteration count variable k in the generalized Huber function and an auxiliary variable based on the initial solution vector $x^{(0)}$, the auxiliary variable changes based on the iteration count variable;

performing the proximal gradient iteration in turn based on the iteration count variable k and the auxiliary variable to obtain a solution vector $x^{(k)}$, and calculating a relative error between the adjacent iteration steps under the iteration count variable until the relative error between adjacent iteration steps is less than a preset adjacent iteration error threshold, stopping iteration and to obtain the solution vector $x^{(k)}$ as the optimal solution; and generating the high-resolution sound image according to the optimal solution.

Preferably, performing the proximal gradient iteration in turn based on the iteration count variable k and the auxiliary variable to obtain the solution vector $x^{(k)}$ comprises:

setting an initialization step size and a step size adjustment count variable based on the initial solution vector $x^{(0)}$;

gradually increasing the iteration count variable k from 0, updating the auxiliary variable as the iteration count variable k, increases and calculating an extrapolation point value under the iteration count variable k;

updating a step size parameter based on the initialization step size synchronously with the iteration count variable k to form a new step size parameter;

updating an optimization target variable according to the auxiliary variable, the relative error between the adjacent iteration steps and the new step size parameter, and obtaining the solution vector $x^{(k)}$ for the sound field reconstruction; and calculating a step size evaluation standard based on the solution vector $x^{(k)}$, wherein if a preset condition is not met, adjusting the step size according to the step size parameter, updating the step size adjustment count variable, and updating the optimization target variable again to obtain an updated solution vector $x^{(k)}$; and if the preset condition is met, recording the current step size and saving the solution vector $x^{(k)}$.

The present disclosure also provides a sound source identification system based on array measurement and sparse prior information, which realizes the above sound source identification method based on array measurement and sparse prior information and comprises:

a basic sound image generating module for building a sound source identification problem model according to a characteristic of a target sound source and position information of array elements in a microphone array, and obtaining a basic sound image based on the sound source identification problem model;

a position index module for extracting a peak in the basic sound image, and obtaining position index information of a solution vector of a potential sound source according to a coordinate of the peak;

an initial solving module for determining the number and a distribution regularity of support sets in the solution vector according to the position index information, and creating an initial solution vector $x^{(0)}$ for sound field reconstruction according to the number and the distribution regularity of the support sets; and an optimal solving module for obtaining an optimal solution based on the initial solution vector $x^{(0)}$ through proximal gradient iteration, and generating a high-resolution sound image according to the optimal solution.

It can be known from the above description that the sound source identification method and system based on array measurement and sparse prior information provided by the present disclosure uses the generalized minimax concave penalty function to apply the sparse constraint on the sound source reconstruction error, and reconstruct the sound source information in the sound field by implementing conventional beamforming and solving the acoustic inverse problem to estimate the sound source position and sound source intensity, so that the high-resolution identification of the sound source can be realized. In addition, the present disclosure determines the position information of the potential sound source according to the basic sound image generated by the conventional beamforming method, and generates the initial solution vector including sound source position prior information in a specific way. Thus, compared with the widely used random initial value and zero initial value, the present disclosure improves the computational efficiency of the sound field reconstruction method based on the generalized minimax concave penalty function. In addition, in the step of solving the acoustic inverse problem including the generalized minimax concave penalty function (obtaining the high-resolution sound image), the iterative convergence speed is improved by using the proximal gradient acceleration and the adaptive step size backtracking strategy, the optimal step size that can meet the convergence is adaptively selected. Compared with the direct solving method, the step of the sound field reconstruction can be completed more quickly, thus, it is helpful to realize high-resolution and high-efficiency sound source identification by using the microphone array.

BRIEF DESCRIPTION OF THE DRAWINGS

By referring to the following description combined with the accompanying drawings and the contents of the claims, and with a more comprehensive understanding of the present disclosure, other objects and results of the present disclosure will be more clear and easy to understand. In the drawings:

DETAILED DESCRIPTION OF EMBODIMENTS

The result obtained by the conventional beamforming method has low spatial resolution, and the sound field reconstruction method based on generalized minimax concave penalty has low computational efficiency.

In view of the above problems, the present disclosure provides a sound source identification method based on array measurement and sparse prior information. The specific embodiments of the present disclosure will be described in detail below in combination with the accompanying drawings.

The description of the following exemplary embodiments is only illustrative in fact and is in no way intended to limit the present disclosure and its application or use. The technology and equipment known to those skilled in the art may not be discussed in detail, but where appropriate, the technology and equipment shall be regarded as a part of the specification.

Figure 1:
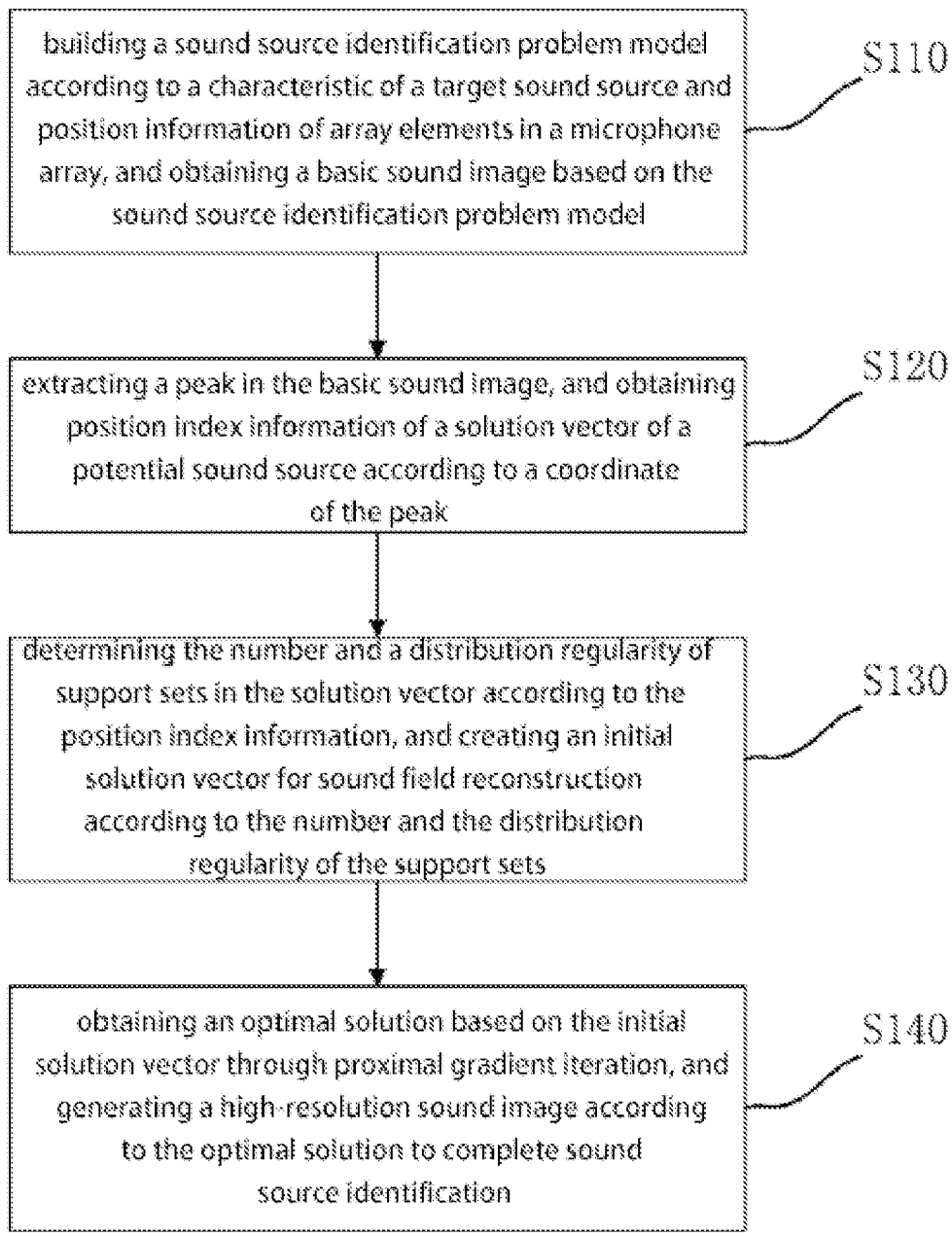
FIG. 1 is a flowchart of a sound source identification method based on array measurement and sparse prior information according to an embodiment of the present disclosure.
Figure 2:
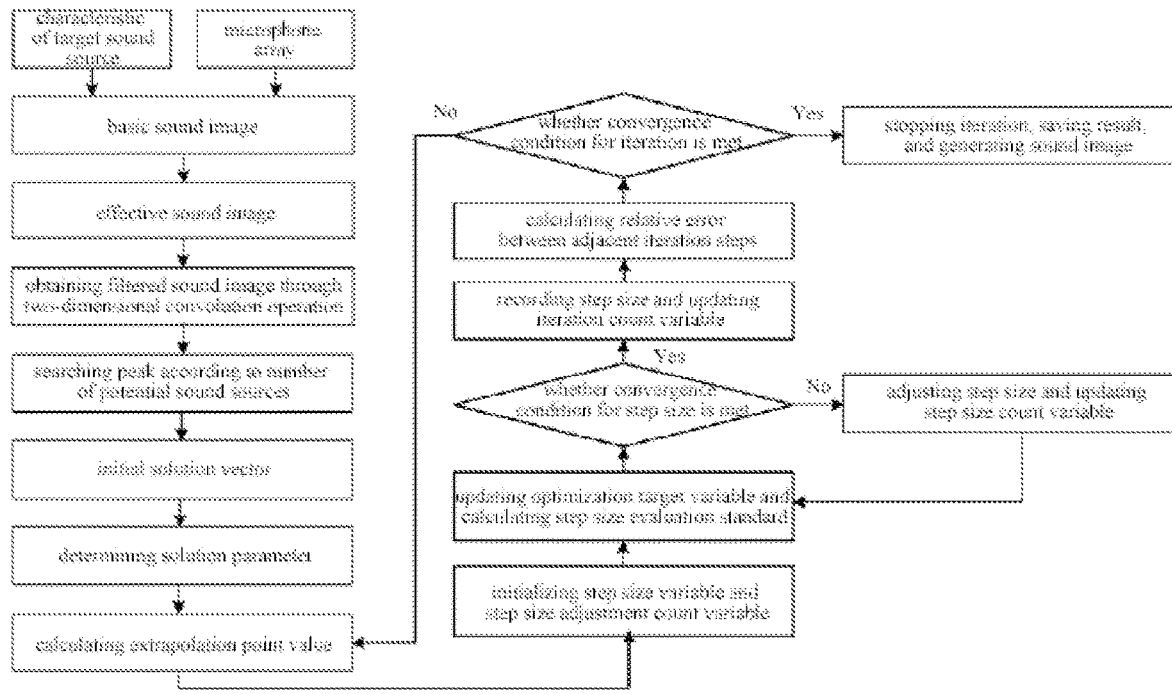
FIG. 2 is a detailed flowchart of the sound source identification method based on array measurement and sparse prior information according to the embodiment of the present disclosure.

As shown in FIG. 1 and FIG. 2, the present disclosure provides a sound source identification method based on array measurement and sparse prior information, which comprises:

S110: building a sound source identification problem model according to a characteristic of a target sound source and position information of array elements in a microphone array, and obtaining a basic sound image based on the sound source identification problem model;

S120: extracting a peak in the basic sound image and obtaining position index information of a solution vector of a potential sound source according to a coordinate of the peak;

S130: determining the number and a distribution regularity of support sets in the solution vector according to the position index information, and creating an initial solution vector $x^{(0)}$ for sound field reconstruction according to the number and the distribution regularity of the support sets; and S140: obtaining an optimal solution based on the initial solution vector $x^{(0)}$ through proximal gradient iteration and generating a high-resolution sound image according to the optimal solution to complete the sound source identification method.

In the embodiment shown in FIG. 1 and FIG. 2, the step S110 is to build the sound source identification problem model according to the characteristic of the target sound source and the position information of the array elements in the microphone array, and to obtain the basic sound image based on the sound source identification problem model. That is, the step S110 is to determine the number and position coordinates of scanning points required for sound field reconstruction according to the characteristic of the target sound source and the position information of the array elements in the microphone array, build the sound source identification problem model according to the number, position coordinates and sound propagation characteristics, then obtain the basic sound image by using the conventional beamforming method, and solve the sound source information in the sound source identification problem model by using the conventional beamforming method according to the minimum energy principle, so as to obtain the basic sound image.

Wherein, the step of building the sound source identification problem model according to the characteristic of the target sound source and the position information of the array elements in the microphone array comprises:

S111: dividing an obtained reconstruction plane into reconstruction grid points, and obtaining a sound source frequency of a preset reconstruction sound source;

S112: calculating a sound signal expressed in a frequency domain corresponding to an array coordinate in the microphone array based on the reconstruction grid points and the sound source frequency; and S113: building the sound source identification problem model between a vector of a sound signal received by the microphone array and a vector of a sound source intensity of the reconstruction sound source according to a relationship between the microphone array and the reconstruction sound source.

The step of obtaining the basic sound image based on the sound source identification problem model comprises:

solving the sound source information about the target sound source in the sound source identification problem model by using the beamforming method according to a minimum energy principle, so as to obtain the basic sound image.

Specifically, ① firstly, the reconstruction plane is obtained, and is divided into reconstruction grid points for N sound sources, wherein the coordinate of each grid point is $u_{sn}$ (n=1 2, . . . , N) and the sound source frequency is f;

② in the microphone array composed of M array elements, the sound signal received by the microphone with the coordinate $u_m$ (m=1, 2, . . . , M) is expressed in the frequency domain as:

$$y_m = \sum_{n=1}^{N} \frac{x_n}{4\pi|u_m - u_{sn}|} \exp\left(-\frac{j2\pi f|u_m - u_{sn}|}{c}\right),$$

where $x_n$ is the sound source intensity, c is the sound velocity, $j=\sqrt{-1}$ is the imaginary unit, and exp is the exponential function;

③ according to the relationship between the signal received by the microphone array and the sound signal described in ②, the sound source identification problem model between the vector $y=[y_1, y_2, \ldots, y_N]^T$, of the sound signal received by the microphone and the vector $x=[x_1, x_2, \ldots, x_N]^T$ of the sound source intensity is built:

y=Ax+r, where the transmission matrix is $$A = \begin{bmatrix} \frac{1}{4\pi|u_1 - u_{s1}|}\exp\left(-\frac{j2\pi f|u_1 - u_{s1}|}{c}\right) & \frac{1}{4\pi|u_1 - u_{s2}|}\exp\left(-\frac{j2\pi f|u_1 - u_{s2}|}{c}\right) & \cdots & \frac{1}{4\pi|u_1 - u_{sN}|}\exp\left(-\frac{j2\pi f|u_1 - u_{sN}|}{c}\right) \\ \frac{1}{4\pi|u_2 - u_{s1}|}\exp\left(-\frac{j2\pi f|u_2 - u_{s1}|}{c}\right) & \frac{1}{4\pi|u_2 - u_{s2}|}\exp\left(-\frac{j2\pi f|u_2 - u_{s2}|}{c}\right) & \cdots & \frac{1}{4\pi|u_2 - u_{sN}|}\exp\left(-\frac{j2\pi f|u_2 - u_{sN}|}{c}\right) \\ \cdots & \cdots & \cdots & \cdots \\ \frac{1}{4\pi|u_M - u_{s1}|}\exp\left(-\frac{j2\pi f|u_M - u_{s1}|}{c}\right) & \frac{1}{4\pi|u_M - u_{s2}|}\exp\left(-\frac{j2\pi f|u_M - u_{s2}|}{c}\right) & \cdots & \frac{1}{4\pi|u_M - u_{sN}|}\exp\left(-\frac{j2\pi f|u_M - u_{sN}|}{c}\right) \end{bmatrix},$$

and the noise vector $r=[r_1, r_2, \ldots, r_N]^T$;

④ then, the conventional beamforming method is used to generate the basic sound image:

$$X = [X_{r,s}]_{R\times S},$$

wherein in the basic sound image, the element $$X_{r,s} = 20\log_{10}\frac{x_n}{x_{ref}}, \text{ where}$$

$$x_n = \frac{a_n^H y}{\|a_n\|_2^2},$$

where $x_{ref}$ is the reference sound source intensity. In a specific implementation process, $x_{ref}$=0.00002 r=1, 2, . . . , R, s=1, 2, . . . , S, R×S=N, n=R(s−1)+r are selected, where $a_n$ is the nth column in the transmission matrix A.

In the embodiment shown in FIG. 1 and FIG. 2, the step S120 is to extract the peak in the basic sound image and obtain the position index information of the solution vector of the potential sound source according to the coordinate of the peak, wherein the step of extracting the peak in the basic sound image and obtaining the position index information of the solution vector of the potential sound source according to the coordinate of the peak comprises:

S121: calculating a mean value of elements included in the basic sound image, and setting elements with values less than a preset value as 0, so as to form an effective sound image;

S122: performing a two-dimensional convolution operation on the effective sound image to obtain a filtered sound image; and S123: traversing and sorting the filtered sound image to form a sorting list, and selecting a position vector of the potential sound source in the sorting list according to a preset number to form the position index information of the solution vector in the sound source identification method.

Specifically, in this embodiment, ① firstly, the mean value $$\alpha_{MAP} = \frac{1}{N}\sum_{r=1}^{R}\sum_{s=1}^{S}X_{r,s}$$

of all elements in the basic sound image is calculated, and the elements in the basic sound image with values less than $\alpha_{MAP}/w$ are set to 0 to form the effective sound image, where $w>0$ is a mean scaling factor; in a specific implementation process, $w=2$ is selected;

② the Gaussian kernel function G is used to perform the two-dimensional convolution operation on the effective sound image processed in the step ① (the sound image after the basic sound image is processed in the step ①): $\hat{X}_{r,s} = G \otimes X_{r,s}$, so as to obtain the filtered sound image;

③ the elements of the filtered sound image are traversed:

$$\hat{X}_{r,s} \geq \hat{X}_{r-1,s-1},$$

$$\hat{X}_{r,s} \geq \hat{X}_{r-1,s},$$

$$\hat{X}_{r,s} \geq \hat{X}_{r-1,s+1},$$

$$\hat{X}_{r,s} \geq \hat{X}_{r,s-1},$$

$$\hat{X}_{r,s} \geq \hat{X}_{r,s+1},$$

$$\hat{X}_{r,s} \geq \hat{X}_{r+1,s-1},$$

$$\hat{X}_{r,s} \geq \hat{X}_{r+1,s},$$

$$\hat{X}_{r,s} \geq \hat{X}_{r+1,s+1},$$

then the positions of the elements that meet the above conditions are arranged in descending order of values, the appropriate number $N_p$ of potential sound sources is selected, and the position vector of the potential sound sources is created:

$$h = [h_1, h_2, \ldots, h_{N_p}]^T,$$

where $h_l$ is the index number of the lth ($l=1, 2, \ldots, N_p$) sound source in the basic sound image in vector form, i.e., the position vector of the lth ($l=1, 2, \ldots, N_p$) sound source, in other words, it is also the position index information of the solution vector in the sound source identification method. In a specific implementation process, $N_p=2$ is selected.

In the embodiment shown in FIG. 1 and FIG. 2, the step S130 is to determine the number and the distribution regularity of the support sets in the solution vector according to the position index information, and to create the initial solution vector $x^{(0)}$ for the sound field reconstruction according to the number and the distribution regularity of the support sets.

Wherein, in the step of creating the initial solution vector $x^{(0)}$ for the sound field reconstruction, the initial solution vector $x^{(0)}$ comprises a position element corresponding to the above position vector and other elements, wherein the value of the position element is generated randomly, and values of other elements other than the position element are 0.

In the embodiment shown in FIG. 1 and FIG. 2, the step S140 is to obtain the optimal solution based on the initial solution vector $x^{(0)}$ through the proximal gradient iteration, so as to obtain the high-resolution sound image to complete the sound source identification. The method further comprises, before the step S140:

S14: constructing an acoustic inverse problem with a minimax concave penalty constraint, wherein the optimal solution is a solution of the acoustic inverse problem. That is, S14 is constructing the acoustic inverse problem with the minimax concave penalty constraint $\psi_B(q) = \|q\|_1 - S_B(q)$, taking $q^{(0)}$ as the initial solution vector, and solving the inverse problem by the methods of proximal gradient iteration, extrapolation point acceleration and adaptive step size update. The step S14 further comprises the step S140, and steps S140-1 and S140-2 included before the step S140, wherein the method further comprises, before obtaining the optimal solution based on the initial solution vector $x^{(0)}$ through the proximal gradient iteration to obtain the high-resolution sound image to complete the sound source identification in the step S140:

S140-1: building a sparsity regularized sound field reconstruction optimal problem model for a generalized Huber function, that is, building $$\min_x \frac{1}{2}\|y - Ax\|_2^2 + \lambda(\|x\|_1 - \rho_B(x)),$$

where $$\rho_B(x) = \inf_v \left\{ \|v\|_1 + \frac{1}{2}\|B(x-v)\|_2^2 \right\}$$

is the generalized Huber function; and
S140-2: constructing a matrix $$B = \sqrt{\frac{\gamma}{\lambda}} A$$

in the generalized Huber function, wherein A is a matrix in the sparsity regularized sound field reconstruction optimal problem model, $\lambda$ is a constructed regularization parameter, and $\gamma$ is a constructed convexity balance parameter.

The step S140 comprises:
S141: initializing an iteration count variable k in the Huber function and an auxiliary variable based on the initial solution vector $x^{(0)}$, the auxiliary variable changes based on the iteration count variable, that is, initializing an auxiliary variable $v^{(k)}$;

S142: performing the proximal gradient iteration in turn based on the iteration count variable k and the auxiliary variable to obtain a solution vector $x^{(k)}$, and calculating a relative error between adjacent iteration steps under the iteration count variable until the relative error between the adjacent iteration steps is less than a preset adjacent iteration error threshold, then stopping iteration and to obtain the solution vector $x^{(k)}$ as the optimal solution; and S143: generating the high-resolution sound image according to the optimal solution to complete the sound source identification method.

Wherein, S142, i.e., the step of performing the proximal gradient iteration in turn based on the iteration count variable k and the auxiliary variable to obtain the solution vector $x^{(k)}$ comprises:

S142-1: setting an initialization step size and a step size adjustment count variable based on the initial solution vector $x^{(0)}$;

S142-2: gradually increasing the iteration count variable k from 0, updating the auxiliary variable as the iteration count variable k increases, and calculating an extrapolation point value under the iteration count variable k;

S142-3: updating a step size parameter based on the initialization step size synchronously with the iteration count variable k to form a new step size parameter;

S142-4: updating an optimization target variable according to the auxiliary variable, the relative error between the adjacent iteration steps and the new step size parameter, and obtaining the solution vector $x^{(k)}$ for the sound field reconstruction; and S142-5: calculating a step size evaluation standard based on the solution vector $x^{(k)}$, wherein if a preset condition is not met, the method comprises adjusting the step size according to the step size parameter, updating the step size adjustment count variable, and updating the optimization target variable again to obtain an updated solution vector $x^{(k)}$; and if the preset condition is met, the method comprises recording current step size and saving the solution vector $x^{(k)}$.

Wherein, while obtaining the solution vector $x^{(k)}$ through iteration, the relative error between the adjacent iteration steps under each iteration count variable is calculated. Ff the relative error between the adjacent iteration steps is less than the preset adjacent iteration error threshold, that is, the convergence condition for iteration is met, the iteration is stopped, and the solution vector $x^{(k)}$ is taken as the optimal solution; if the relative error between adjacent iterative steps is not less than the preset adjacent iterative error threshold, $$x^{(k+1)} = \arg\min_x \left\{ \frac{1}{2\lambda n_t^{(k)}} \left\| x - y^{(k)} + \eta_t^{(k)} A^T \left[ A y^{(k)} + \gamma A (v^{(k)} - y^{(k)}) - y \right] \right\|_2^2 + \|x\|_1 \right\},$$

$$v^{(k+1)} = \arg\min_v \left[ \frac{1}{2\lambda n_t^{(k)}} \left\| v - v^{(k)} + \eta_t^{(k)} \gamma A^T A (v^{(k)} - x^{(k+1)}) \right\|_2^2 + \|v\|_1 \right];$$

that is, the convergence condition for iteration is not met, continue to return to the step S142-2 to continue iterative calculation.

In the embodiment of the present disclosure, the regularization parameter is $\lambda$, the convexity balance parameter is $\gamma$, the step size adjustment parameter is $\beta$, the initial step size is $\eta_0$, the initialization auxiliary variable is $v^{(k)}$, the relative error between adjacent iteration steps is $r^{(k)}$, and the iteration count variable starts from k=0, wherein in this embodiment, the initial $\lambda$=0.5, $\gamma$=0.5, $\beta$=0.8

$$\eta_0 = 10 \max\left\{1, \frac{\gamma}{1-\gamma}\right\} \|A^T A\|_2;$$

the convergence condition for iteration is set that the relative error between the adjacent iterative steps is less than the preset adjacent iterative error threshold $r_{end}$, and the adjacent iterative error threshold $r_{end}$ is not specifically limited, wherein in this embodiment $r^{(0)}$=10000, $r_{end}$=0.001.

In addition, it should be noted that an appropriate regularization parameter $\lambda$>0 and a convexity balance parameter 0<$\gamma$<1 are selected to restrict the sparsity of the solution result. In the process of solving the sound field reconstruction problem by means of proximal gradient descent, it is also necessary to update the parameter $x^{(0)} - \eta_0 \nabla f_1(x^{(0)})$ according to the initial step size $\eta_0$ first. In order to balance the efficiency and accuracy of the iterative calculation, an appropriate step size adjustment parameter 0<$\beta$<1 is selected to reduce the step size proportionally during the iterative calculation ($\eta_{t+1}^{(k)} = \beta \eta_t^{(k)}$), so as to ensure the calculation speed at the initial stage of solving and the calculation accuracy at the later stage of solving.

Specifically, when implementing this embodiment, the implementation process of performing the proximal gradient iteration in turn based on the iteration count variable k and the auxiliary variable to obtain the solution vector $x^{(k)}$ is as follows:

① if k=0, calculating the value of the extrapolation point according to the following formula:

$$y^{(k)} = x^{(k)};$$

otherwise, calculating the value of the extrapolation point according to the following formula:

$$y^{(k)} = x^{(k)} + \theta^{(k)}(x^{(k)} - x^{(k-1)}), \text{ where } \theta^{(k)} = \frac{t_k - 1}{t_{k+1}}, t_k^2 = t_{k+1}^2 - t_{k+1}, t_0 = 1;$$

② initializing the step size variable $$\eta_0^{(k)} \begin{cases} \eta^{(0)}, k = 0 \\ \eta^{(k1)}, k > 0 \end{cases}$$

and the step size adjustment count variable t=0;

③ updating the optimization target variables:

④ calculating the step size evaluation indexes:

$$x_p = \text{prox}_{\eta f_2}[x^{(k)} - \eta_t^{(k)} \nabla f_1(x^{(k)})],$$

$$f_{1\eta}(x_p, x^{(k)}) = f_1(x^{(k)}) + \nabla f_1(x^{(k)})^T (x_p - x^{(k)}) + \frac{1}{2\eta_t^{(k)}} \|x_p - x^{(k)}\|_2^2,$$

where $\text{prox}_{\eta f}(\bullet)$ is the proximal gradient operator, $\nabla f$ is the f gradient of the function, the smooth term is $$f_1(x) = \frac{1}{2} \|y - Ax\|_2^2 - \lambda \|v\|_1 - \frac{\lambda}{2} \|B(x - v)\|_2^2,$$

and the nonsmooth term is $f_2(x) = \lambda \|x\|_1$.

⑤ if $f_1(x_p) \leq f_{1\eta}(x_p, x^{(k)})$ recording the current step size and updating the iteration count variable:

$$\eta^{(k)} = \eta_t^{(k)},$$

$$k = k + 1;$$

otherwise, adjusting the step size according to the step size adjustment parameter and updating the step size count variable:

$$\eta_{t+1}^{(k)} = \beta \eta_t^{(k)},$$

$$t = t + 1,$$

and returning to the step ③;

⑥ calculating the relative error between adjacent iteration steps:

$$r = \sqrt{\frac{\|x^{(k)} - x^{(k-1)}\|_2^2}{\|x^{(k)}\|_2^2}},$$

if $r < r_{end}$, stopping the iteration, saving the result $x = x^{(k)}$ and generating the sound image; otherwise, returning to the step ①.

Figure 3:
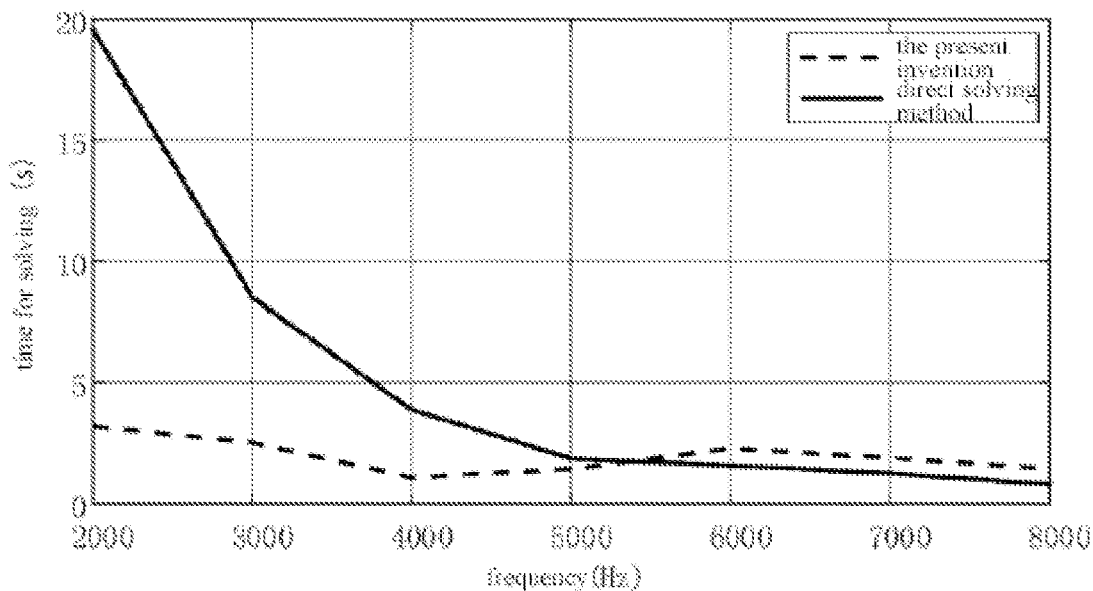
FIG. 3 shows a variation regularity of time with the sound source frequency in the solving process of the sound source identification method based on array measurement and sparse prior information according to the embodiment of the present disclosure, and the variation regularity of time required by the direct solving method with the sound source frequency.

As shown in FIG. 3, in the whole step of solving the acoustic inverse problem including the generalized minimax concave penalty function, the iterative convergence speed is improved by using a proximal gradient acceleration and an adaptive step size backtracking strategy, and the optimal step size that can meet the convergence is adaptively selected. Compared with the direct solving method, the step of the sound field reconstruction can be completed more quickly, thus, it is helpful to realize high-resolution and high-efficiency sound source identification by using the microphone array.

Figure 4:
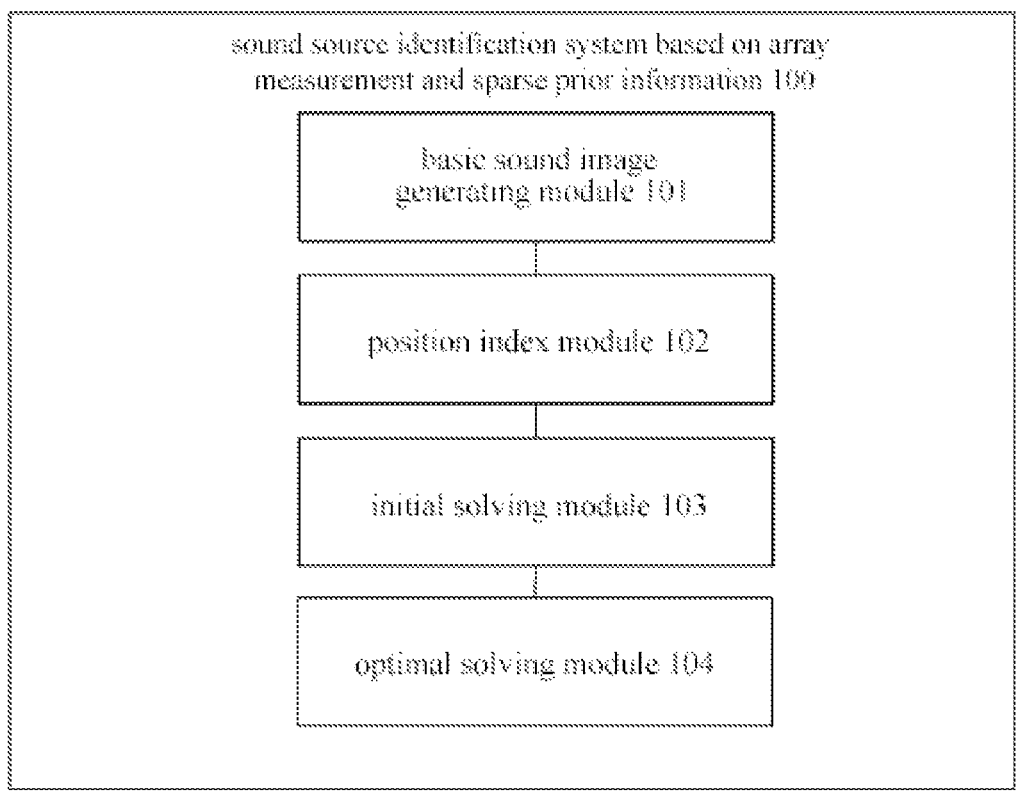
FIG. 4 is a system framework diagram of a sound source identification system based on array measurement and sparse prior information according to an embodiment of the present disclosure.

As shown in FIG. 4, the present disclosure also provides a sound source identification system 100 based on array measurement and sparse prior information, which realizes the above sound source identification method based on array measurement and sparse prior information and comprises:

a basic sound image generating module 101 for building a sound source identification problem model according to a characteristic of a target sound source and position information of array elements in a microphone array, and obtaining a basic sound image based on the sound source identification problem model;

a position index module 102 for extracting a peak in the basic sound image, and obtaining position index information of a solution vector of a potential sound source according to a coordinate of the peak;

an initial solving module 103 for determining the number and a distribution regularity of support sets in the solution vector according to the position index information, and creating an initial solution vector $x^{(0)}$ for sound field reconstruction according to the number and the distribution regularity of the support sets; and an optimal solving module 104 for obtaining an optimal solution based on the initial solution vector $x^{(0)}$ through proximal gradient iteration, and generating a high-resolution sound image according to the optimal solution to complete sound source identification.

As described above, the sound source identification method and system based on array measurement and sparse prior information provided by the present disclosure uses the generalized minimax concave penalty function to apply the sparse constraint on the sound source reconstruction error, and reconstruct the sound source information in the sound field by implementing conventional beamforming and solving the acoustic inverse problem to estimate the sound source position and sound source intensity, so that the high-resolution identification of the sound source can be realized. In addition, the present disclosure determines the position information of the potential sound source according to the basic sound image generated by the conventional beamforming method, and generates the initial solution vector including the prior information of the sound source position in a specific way. Thus, compared with the widely used random initial value and zero initial value, the present disclosure improves the computational efficiency of the sound field reconstruction method based on the generalized minimax concave penalty function. In addition, in the step of solving the acoustic inverse problem including the generalized minimax concave penalty function (obtaining the high-resolution sound image), the iterative convergence speed is improved by using the proximal gradient acceleration and the adaptive step size backtracking strategy, the optimal step size that can meet the convergence is adaptively selected. Compared with the direct solving method, the step of the sound field reconstruction can be completed more quickly, thus, it is helpful to realize high-resolution and high-efficiency sound source identification by using the microphone array.

The sound source identification method and system based on array measurement and sparse prior information according to the present disclosure are described by way of example with reference to the accompanying drawings. However, those skilled in the art should understand that various improvements can be made to the sound source identification method and system based on array measurement and sparse prior information proposed by the present disclosure without departing from the content of the present disclosure. Therefore, the protection scope of the present disclosure should be determined by the contents of the appended claims.

The invention claimed is:

1. A sound source identification method based on array measurement and sparse prior information, comprising:

building a sound source identification problem model according to a characteristic of a target sound source and position information of array elements in a microphone array, and obtaining a basic sound image based on the sound source identification problem model;

extracting a peak in the basic sound image and obtaining position index information of a solution vector of a potential sound source according to a coordinate of the peak;

determining a number and a distribution regularity of support sets in the solution vector according to the position index information, and creating an initial solution vector $x^{(0)}$ for sound field reconstruction according to the number and the distribution regularity of the support sets;

obtaining an optimal solution based on the initial solution vector $x^{(0)}$ through proximal gradient iteration;

generating a high-resolution sound image according to the optimal solution; and using the generated high-resolution sound image, identifying a visual identification of the target sound source, a position of the target sound source, an intensity of the target sound source, sound signal characteristics of the target sound source, locations and general mechanisms of an abnormal sound and a noise, and key information for structural health monitoring and fault diagnosis of medical equipment.

2. The sound source identification method based on array measurement and sparse prior information according to claim 1, wherein building the sound source identification problem model according to the characteristic of the target sound source and the position information of the array elements in the microphone array comprises:

dividing an obtained reconstruction plane into reconstruction grid points, and obtaining a sound source frequency of a preset reconstruction sound source;

calculating a sound signal expressed in a frequency domain corresponding to an array coordinate in the microphone array based on the reconstruction grid points and the sound source frequency; and building the sound source identification problem model between a vector of a sound signal received by the microphone array and a vector of a sound source intensity of the reconstruction sound source according to a relationship between the microphone array and the reconstruction sound source.

3. The sound source identification method based on array measurement and sparse prior information according to claim 2, wherein obtaining the basic sound image based on the sound source identification problem model comprises:

solving sound source information about the target sound source in the sound source identification problem model by using a beamforming method according to a minimum energy principle, so as to obtain the basic sound image.

4. The sound source identification method based on array measurement and sparse prior information according to claim 3, wherein extracting the peak in the basic sound image and obtaining the position index information of the solution vector of the potential sound source according to the coordinate of the peak comprises:

calculating a mean value of elements included in the basic sound image, and setting elements with values less than a preset value as 0, so as to form an effective sound image;

performing a two-dimensional convolution operation on the effective sound image to obtain a filtered sound image; and traversing and sorting the filtered sound image to form a sorting list, and selecting a position vector of the potential sound source in the sorting list according to a preset number to form the position index information of the solution vector in the sound source identification method.

5. The sound source identification method based on array measurement and sparse prior information according to claim 4, wherein in creating the initial solution vector $x^{(0)}$ for the sound field reconstruction, the initial solution vector $x^{(0)}$ comprises a position element corresponding to the position vector and other elements, and wherein a value of the position element is randomly generated, and values of the other elements are 0.

6. The sound source identification method based on array measurement and sparse prior information according to claim 5, wherein the method further comprises, before obtaining the optimal solution based on the initial solution vector $x^{(0)}$ through the proximal gradient iteration and generating the high-resolution sound image according to the optimal solution:

constructing an acoustic inverse problem with a minimax concave penalty constraint, wherein the optimal solution is a solution of the acoustic inverse problem.

7. The sound source identification method based on array measurement and sparse prior information according to claim 6, wherein the method further comprises, before obtaining the optimal solution based on the initial solution vector $x^{(0)}$ through the proximal gradient iteration and generating the high-resolution sound image according to the optimal solution:

building a sparsity regularized sound field reconstruction optimal problem model for a generalized Huber function; and constructing a matrix $$B = \sqrt{\frac{\gamma}{\lambda}} A$$

in the generalized Huber function, wherein A is a matrix in the sparsity regularized sound field reconstruction optimal problem model, $\lambda$ is a constructed regularization parameter, and $\gamma$ is a constructed convexity balance parameter.

8. The sound source identification method based on array measurement and sparse prior information according to claim 7, wherein obtaining the optimal solution based on the initial solution vector $x^{(0)}$ through the proximal gradient iteration and generating the high-resolution sound image according to the optimal solution comprises:

initializing an iteration count variable k in the generalized Huber function and an auxiliary variable based on the initial solution vector $x^{(0)}$, the auxiliary variable changes based on the iteration count variable;

performing the proximal gradient iteration in turn based on the iteration count variable k and the auxiliary variable to obtain a solution vector $x^{(k)}$, and calculating a relative error between adjacent iteration steps under the iteration count variable until the relative error between the adjacent iteration steps is less than a preset adjacent iteration error threshold, stopping iteration and to obtain the solution vector $x^{(k)}$ as the optimal solution; and generating the high-resolution sound image according to the optimal solution.

9. The sound source identification method based on array measurement and sparse prior information according to claim 8, wherein performing the proximal gradient iteration in turn based on the iteration count variable k and the auxiliary variable to obtain the solution vector $x^{(k)}$ comprises:

setting an initialization step size and a step size adjustment count variable based on the initial solution vector $x^{(0)}$, gradually increasing the iteration count variable k from 0, updating the auxiliary variable as the iteration count variable k increases, and calculating an extrapolation point value under the iteration count variable k;

updating a step size parameter based on the initialization step size synchronously with the iteration count variable k to form a new step size parameter;

updating an optimization target variable according to the auxiliary variable, the relative error between the adjacent iteration steps and the new step size parameter, and obtaining the solution vector $x^{(k)}$ for the sound field reconstruction;

calculating a step size evaluation standard based on the solution vector $x^{(k)}$, wherein a preset condition is met; and recording current step size and saving the solution vector $x^{(k)}$.

10. A sound source identification system based on array measurement and sparse prior information, which realizes the sound source identification method based on array measurement and sparse prior information according to claim 1, comprising:

a basic sound image generating module for building a sound source identification problem model according to a characteristic of a target sound source and position information of array elements in a microphone array, and obtaining a basic sound image based on the sound source identification problem model;

a position index module for extracting a peak in the basic sound image and obtaining position index information of a solution vector of a potential sound source according to a coordinate of the peak;

an initial solving module for determining a number and a distribution regularity of support sets in the solution vector according to the position index information, and creating an initial solution vector $x^{(0)}$ for sound field reconstruction according to the number and the distribution regularity of the support sets; and an optimal solving module for:
  obtaining an optimal solution based on the initial solution vector $x^{(0)}$ through proximal gradient iteration; and
  generating a high-resolution sound image according to the optimal solution used to identify a visual identification of the target sound source, a position of the target sound source, an intensity of the target sound source, sound signal characteristics of the target sound source, locations and general mechanisms of an abnormal sound and a noise, and key information for structural health monitoring and fault diagnosis of medical equipment.

* * * * *